United States Patent
Hanus et al.

(10) Patent No.: US 10,675,696 B2
(45) Date of Patent: Jun. 9, 2020

(54) METHOD FOR MACHINING A TOOTHING, A MACHINING TOOL, AND A MACHINE TOOL

(71) Applicant: GLEASON-PFAUTER MASCHINENFABRIK GMBH, Ludwigsburg (DE)

(72) Inventors: Elmar Hanus, Hemmingen (DE); Ralf Schmezer, Ludwigsburg (DE)

(73) Assignee: GLEASON-PFAUTER MASCHINENFABRIK GMBH, Ludwigsburg (DE)

(*) Notice: Subject to any disclaimer, the term of this patent is extended or adjusted under 35 U.S.C. 154(b) by 102 days.

(21) Appl. No.: 15/505,717

(22) PCT Filed: Aug. 3, 2015

(86) PCT No.: PCT/EP2015/001593
§ 371 (c)(1),
(2) Date: Feb. 22, 2017

(87) PCT Pub. No.: WO2016/034260
PCT Pub. Date: Mar. 10, 2016

(65) Prior Publication Data
US 2017/0252842 A1    Sep. 7, 2017

(30) Foreign Application Priority Data
Sep. 5, 2014   (DE) .................. 10 2014 013 230

(51) Int. Cl.
*B23F 19/10*    (2006.01)
*B23F 21/00*    (2006.01)
(Continued)

(52) U.S. Cl.
CPC ............ *B23F 19/10* (2013.01); *B23B 27/083* (2013.01); *B23D 71/005* (2013.01); *B23D 71/02* (2013.01);
(Continued)

(58) Field of Classification Search
CPC ...... B23F 19/10; B23F 21/005; B23F 19/101; B23F 19/102; B23F 19/107;
(Continued)

(56) References Cited

U.S. PATENT DOCUMENTS 2,278,576 A * 4/1942 Wildhaber ............. B24B 3/022
                                                       409/122
2,768,422 A * 10/1956 McKenna ............. B23D 73/00
                                                       407/29.13
(Continued)

FOREIGN PATENT DOCUMENTS

CN    102756182 A  * 10/2012
DE       8026616 U1    2/1982
(Continued)

OTHER PUBLICATIONS

Machine Translation of EP 497257 A2, which EP '257 was published Aug. 1992. (Year: 1992).*
(Continued)

*Primary Examiner* — Erica E Cadugan
(74) *Attorney, Agent, or Firm* — Robert L. McDowell

(57) ABSTRACT

The invention relates to a method for machining a toothing that is chamfered on a tooth head front edge, in which a material projection resulting on said tooth head front edge chamfer, caused by chamfer formation on a tooth front edge of the toothing by means of plastic deformation, and/or caused by removing a primary/secondary burr produced on said end face during production of the toothing and, if applicable, formation of the tooth front edge chamfer, is (Continued)

Figure 1:
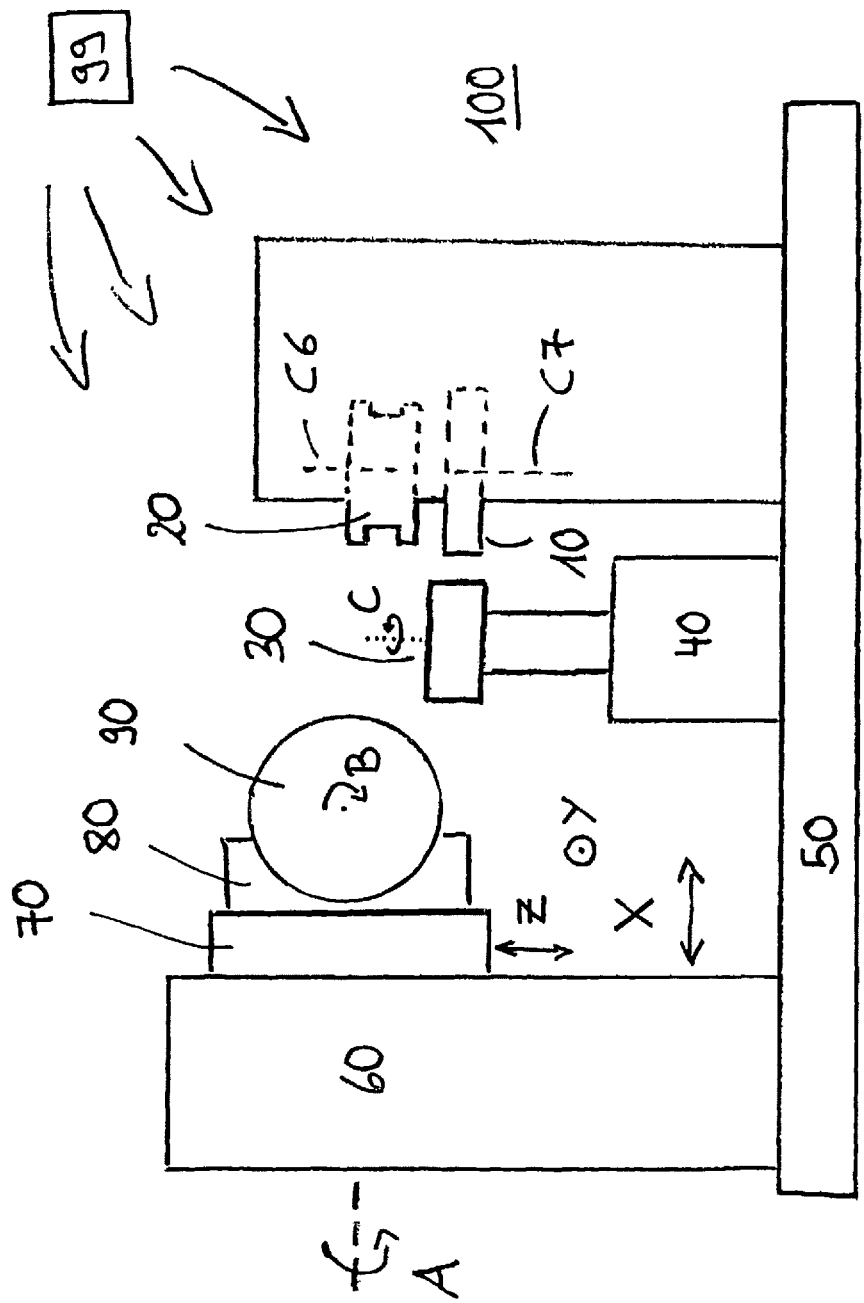

removed in a rotational operation by a machining procedure with a machining tool that has a cutting edge.

12 Claims, 7 Drawing Sheets

(51) Int. Cl.
  *B23D 71/02* (2006.01)
  *B23F 17/00* (2006.01)
  *B23B 27/08* (2006.01)
  *B23D 71/00* (2006.01)
  *B23F 5/22* (2006.01)

(52) U.S. Cl.
  CPC .......... *B23F 17/006* (2013.01); *B23F 21/005* (2013.01); *B23F 5/22* (2013.01); *Y10T 29/5176* (2015.01); *Y10T 407/1735* (2015.01); *Y10T 407/1745* (2015.01); *Y10T 407/1815* (2015.01); *Y10T 409/10159* (2015.01); *Y10T 409/101113* (2015.01); *Y10T 409/108586* (2015.01)

(58) Field of Classification Search
  CPC ......... B23D 71/005; Y10T 409/101113; Y10T 407/1815; Y10T 407/17–1745; Y10T 29/5176
  USPC ................ 409/8; 407/29.13, 20–29; 29/56.5
  See application file for complete search history.

(56) References Cited

U.S. PATENT DOCUMENTS

| | | | | |
|---|---|---|---|---|
| 5,158,400 | A * | 10/1992 | Skinner | B23F 21/243 407/12 |
| 6,050,755 | A | 4/2000 | Huber et al. | |
| 8,186,032 | B2 * | 5/2012 | Carmincke | B23F 17/006 29/50 |
| 2010/0273400 | A1 * | 10/2010 | Schaeferling | B23F 19/007 451/47 |
| 2014/0053405 | A1 | 2/2014 | Fleischer et al. | |

FOREIGN PATENT DOCUMENTS

| | | | |
|---|---|---|---|
| DE | 8307877 U1 | 4/1984 | |
| DE | 4020611 C1 | 5/1991 | |
| DE | 4134441 A1 * | 4/1993 | |
| DE | 20204908 U1 * | 6/2002 | |
| DE | 10258549 A1 * | 5/2004 | |
| DE | 10309116 A1 | 9/2004 | |
| EP | 0497257 A2 | 8/1992 | |
| JP | 3056882 U | 12/1998 | |
| JP | 2014-514172 A | 6/2014 | |
| WO | WO-2005/023476 A1 * | 3/2005 | |

OTHER PUBLICATIONS

Machine Translation of DE 10309116 A1, which DE '116 was published Sep. 2004.*
Machine Translation of DE 20204908-U1, which DE '908 was published Jun. 2002.*
International Search Report and Written Opinion for PCT/EP2015/001593, ISA/EPO, dated Nov. 30, 2015, 12 pgs.
Search Report of German Patent and Trademark Office for DE Appln. No. 102014013230.7, dated Apr. 22, 2015, 6 pgs.
Espacenet, EPO, bibliographic data for DE 10309116 A1, English Abstract, 1 pg.
Bausch, Thomas, "Innovative Zahnradfertigung", 3rd Edition, 2006, pp. 304, 309-310.

* cited by examiner

Common Drive That Brings About the Radial Infeed of Both the Chamfering Tool and the Machining Tool

FIG. 7

Common Drive That Brings About the Axial Displacement of Both the Chamfering Tool and the Machine Tool

FIG. 8

METHOD FOR MACHINING A TOOTHING, A MACHINING TOOL, AND A MACHINE TOOL

The invention relates to a method for machining a toothing that is provided with a chamfer on a tooth tip end edge, and to machining tools and machine tools suitable therefor.

In a known manner, the tooth tip end edge of a toothing is often provided with a chamfer that protects the tooth tip and is already present on the wheel blank prior to producing the toothing itself. This chamfer is shown, for example, in drawing 8.1-1, the top left-hand drawing in Thomas Bausch, Innovative Zahnradfertigung [Innovative Gear Wheel Manufacturing], 3rd edition, page 304, where it is denoted C. In contrast, the chamfer, denoted B in this drawing, on the tooth end edge is often produced during secondary machining of the toothing after the toothing has been produced. This can be achieved by cutting or by means of plastic deformation, for example by means of roller deburring which is known and is also described subsequently in the citation by Bausch. The quality of the secondary-machined toothing is therefore closely related to the type and precision of the production of the chamfer on the tooth end edge. In addition, when chamfering a tooth end edge by means of plastic deformation, "secondary burrs" form on the end face of the toothing and mounds of material accumulate on the tooth flanks, both of which need to be removed for various reasons, for example by rolling flat the mounds of material on the tooth blanks, by cutting or filing off the secondary burrs, etc. Carrying out these secondary machining steps also affects the quality of the toothing.

The object of the invention is that of providing toothings having a high toothing quality in a method of the type mentioned at the outset.

This object is achieved by the invention by a development of the method of the type mentioned at the outset, in which excess material on the chamfer on the tooth tip end edge that results from chamfering on a tooth end edge of the toothing by means of plastic deformation and/or from removal of a primary/secondary burr produced on the end face during production of the toothing and optionally during chamfering of the tooth end edge is removed by machining engagement in a turning operation using a machining tool that is provided with a cutting edge.

In this case, the concept on which the invention is based is that excess material can also arise on the chamfer of the tooth tip end edge during the process of producing the toothing and chamfering the tooth end edge, the removal of which excess material in a turning operation results in increased toothing quality. The invention is also based on findings regarding a cutting edge for the turning operation that is suitable for being correspondingly integrated into the overall machining of the toothing.

In a preferred embodiment, the removal of the secondary burrs and/or the chamfering on the tooth end edge occurs at the same location and/or in the same setting of the machined toothing as the turning operation, and in particular from the same side. This allows shorter machining times and structurally more compact implementations for the machining. Preferably, the direction of rotation is reversed during chamfering of the tooth end edge, but not between the chamfering of the tooth end edge and the turning operation. This produces good machining results with short idle times.

In a particularly preferred embodiment of the method, the secondary burrs are removed using the same machining tool as is used in the turning operation, in particular by means of filing off. This further improves the compactness of the tool structures required for the machining, and in particular increases the quality of the machined end faces of the toothing. The turning operation is preferably carried out before the secondary burr removal. In addition, secondary machining of tooth flanks can take place during the secondary burr removal.

According to a further preferred aspect of the method, the machining tool is also used, in particular while producing the toothing, to remove the primary burrs that form in the process on the end face of the toothing. The tools for secondary burr removal can thus be released, and in addition in particular the tool structure required for the machining is made even more compact.

In a further preferred embodiment of the method, radial infeed motions on the tool side for the chamfering on the tooth end edge and for the turning operation are coupled together, axial displacement movements on the tool side for the chamfering on the tooth end edge and for the turning operation are coupled together, and/or rotary movement possibilities on the tool side for the chamfering on the tooth end edge and for the turning operation are decoupled from one another. A good balance between flexibility of the method and savings of space and work is thus achieved.

In a particularly preferred embodiment of the method, the machining tool is moved into a different rotational position between its use and the chamfering of the tooth end edge. This allows for tool structures for the machining that are space-saving but not susceptible to collisions.

In terms of tool technology, the object is achieved by a machining tool for machining a chamfer formed on a tooth tip end edge of a toothing, comprising a cutting edge for removing excess material from the chamfer on the tooth tip end edge, the machining tool being formed in the manner of a disc, having a second peripheral region that has a radial extension that is different from a first radial extension of a first peripheral region, and the cutting edge being arranged at a transition between the first and the second peripheral region. The geometry of the machining tool according to the invention allows for a plurality of functions that are achieved in a compact manner and that are space-saving in nature.

In a particularly preferred embodiment, the first peripheral region has a surface structure on at least one of its flat surfaces that forms a file. This makes a high quality of the end faces of the workpiece toothing possible by filing off the secondary burrs.

In a particularly preferred embodiment, the second region has a smaller radial extent than the first region. This permits collision-free positioning of the machining tool when it is not in use. It is provided, in particular, for the difference in the radial extent between the first and second region to differ from twice the radial depth of the file structure by no more than 70%, preferably no more than 50%, in particular no more than 30%. It is preferred for the second region to extend over at least 40°, preferably at least 50°, and certainly also over 60° or more in the peripheral direction. In contrast, the portion of the first region having the file structure is intended to extend over at least 80°, preferably at least 100°, in particular at least 120°.

In a further preferred embodiment, a joint face having a radial and an axial main extension component is formed at the transition. This means that two vectors can be found that span the joint face and extend once radially and once axially with a predominant direction component.

In one embodiment, the cutting edge can be an outer edge of the joint face. In another embodiment, a cutting insert can be used, which insert carries the cutting edge, in particular a HM insert, and which is appropriately attached to the tool, in particular on the joint face.

In a further preferred embodiment, the first region has two sub-regions that have different geometrical designs and are in particular peripherally mutually spaced, for example in the form of different radii. The flexibility of the machining tool is thus increased, and it is possible in particular to respond to different contours/interfering contours on both sides of the machined workpiece toothing. In this case, the difference in the design can also be in the arrangement of the transitions to the regions having a smaller radial extent.

In this connection, it is provided in particular for a peripheral intermediate region formed between two subregions to also have a cutting edge at the transition to an adjacent subregion and/or to have a smaller radial extent than said subregion. The intermediate region can thus carry out the same basic functions as the second peripheral region but also, if necessary, having a geometrically different adjustment.

In a further preferred embodiment, a further cutting edge having at least one radial direction component is formed in the region of the transition between the first and the second region, the direction of extension of which cutting edge extends substantially in parallel with the disc plane. A cutting edge, in particular for removing primary burrs that result while generating the toothing, is thus provided on the end face.

The machining tool is intended to be able to be moved into various rotational positions and, for this purpose, is designed, at a central disc region, so as to have a setting that permits rotatability about the disc axis thereof.

With regard to the function of the file structure, the machining tool is preferably designed so as to be effective in a manner independent of the direction of rotation. It is thus possible to carry out parallel machining using said tool, independently, for example, of the lead direction of a hobbing cutter.

Furthermore, the invention also relates to a toothing machining assembly comprising a chamfering tool that is driven so as to rotate about the chamfering tool axis of said assembly and is intended for plastically deforming an end edge of a toothing, in particular during roller deburring, and comprising a machining tool that is formed according to one or more of the aspects described above.

In this case, it is provided in particular for the chamfering tool and the machining tool to be positioned from the same side and to have preferably parallel, in particular coaxial, axes of rotation in order to machine a toothing. This makes it possible to form a compact chamfering and deburring station.

For this purpose, in particular a first common drive that brings about the radial infeed of both the chamfering tool and the machining tool, and/or a second common drive that brings about the axial displacement of both the chamfering tool and the machining tool, is provided. This permits a more compact chamfering and deburring station that is also cheaper to manufacture, on account of the synergistic use of the drives.

It is also preferably provided for the chamfering tool and the machining tool to be able to be driven independently of one another so as to rotate about their respective axes and to have corresponding separate rotary drives, in particular CNC-controlled direct drives.

In this connection, it is provided for the toothing machining assembly to be able to occupy a first operating position in which the chamfering tool projects radially beyond the cutting tool with respect to the radial infeed direction, towards the toothing to be machined, and vice versa in a second operating position, it being possible to achieve a transition between the two operating positions by rotating the machining tool. This permits a collision-free arrangement of the respective tools when they are not in use.

In order to respond to any minor unevenness, in an expedient embodiment the machining tool is axially spring-mounted relative to the chamfering tool.

Finally, the invention also relates to a machine tool for machining toothings, comprising a gear-cutting tool, in particular a hobbing cutter, for producing a toothing on a workpiece, and comprising a machining tool according to any of the above-mentioned aspects and/or comprising a toothing machining assembly according to the aspects mentioned above. In place of hobbing, however, for example hob peeling (power skiving) using a peeling gear, or gear shaping using a generating cutter could be used as the manufacturing method.

As a CNC-controlled servomotor, the common drive for the radial infeed motion can also apply the contact pressure required for chamfering. The drive for the rotational movement of the chamfering tool is synchronised with the rotary drive for the workpiece toothing for the chamfering operation in rolling engagement. In terms of control, it is also provided that, in order to produce the rolling engagement contact, the chamfering tool be threaded in without the use of force and that control information regarding the rotary chamfer of the chamfering tool required for the rolling engagement be able to already be determined from the rotary chamfer information regarding the workpiece toothing that is available on account of the production using the primary tool, in particular without any additional centring operation (transition to the electronic coupling).

The advantageous aspects of the invention that are not necessarily related to the machining of the chamfer on the tooth tip end edge are also disclosed by the invention as being independently worthy of protection. This relates to the design of the machining tool for secondary burr removal in which a region having a smaller radial extent is formed. The invention thus also discloses, as being independently worthy of protection, a machining tool for machining an end face of a toothing, the machining tool being formed in the manner of a disc, having a second peripheral region that has a radial extension that is different from a first radial extension of a first peripheral region, and in which the first peripheral region has a surface structure on at least one of its flat surfaces that forms a file, in particular having one or more of the design features described above.

The invention additionally discloses, as being independently worthy of protection, a toothing machining assembly comprising a chamfering tool that is driven so as to rotate about the chamfering tool axis of said assembly and is intended for plastically deforming an end edge of a toothing, in particular during roller deburring, and in particular comprising a machining tool of this kind for secondary burr removal, the secondary burr removal and the chamfering on the tooth end edge being carried out from the same side with respect to the toothing to be machined, said assembly in particular having one or more of the designs described above, in particular the common positioning drives and the separate rotary drives.

Figure 2:
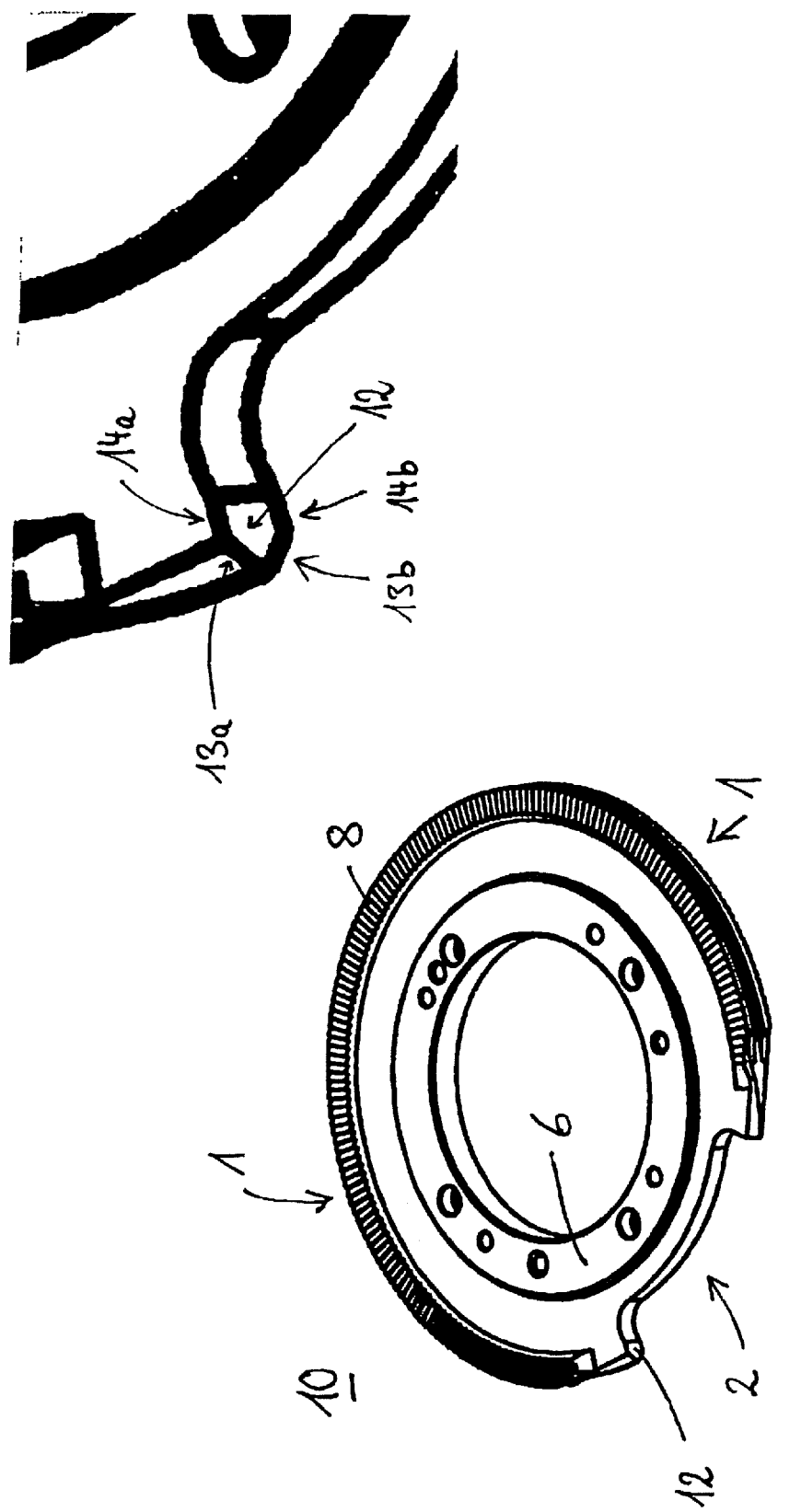
Figure 3:
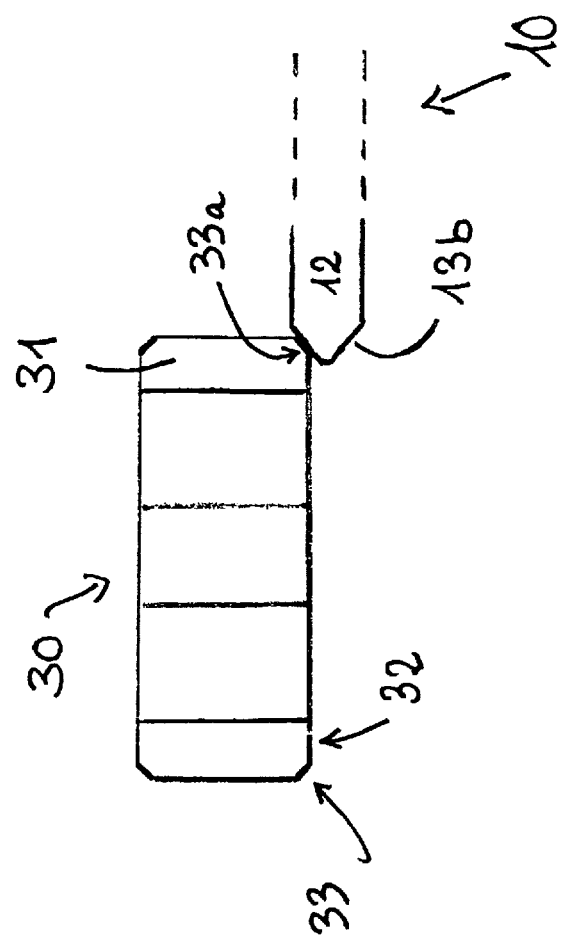
Figure 4:
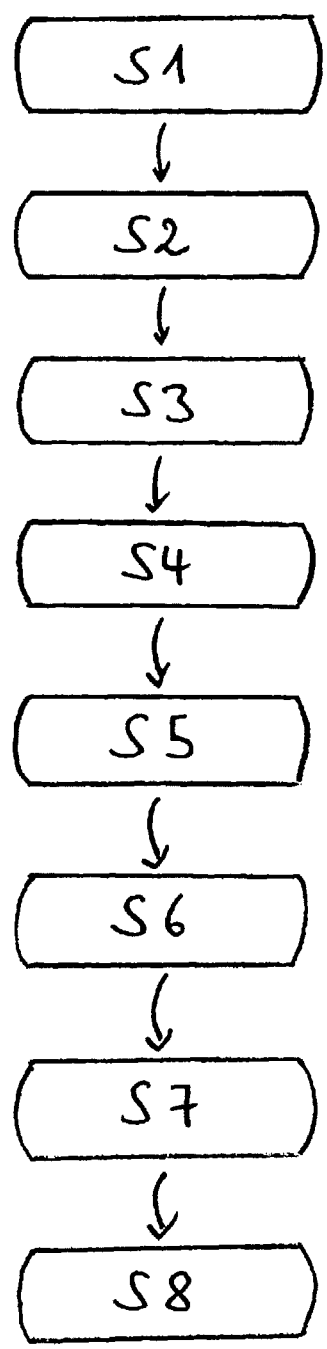
Figure 5:
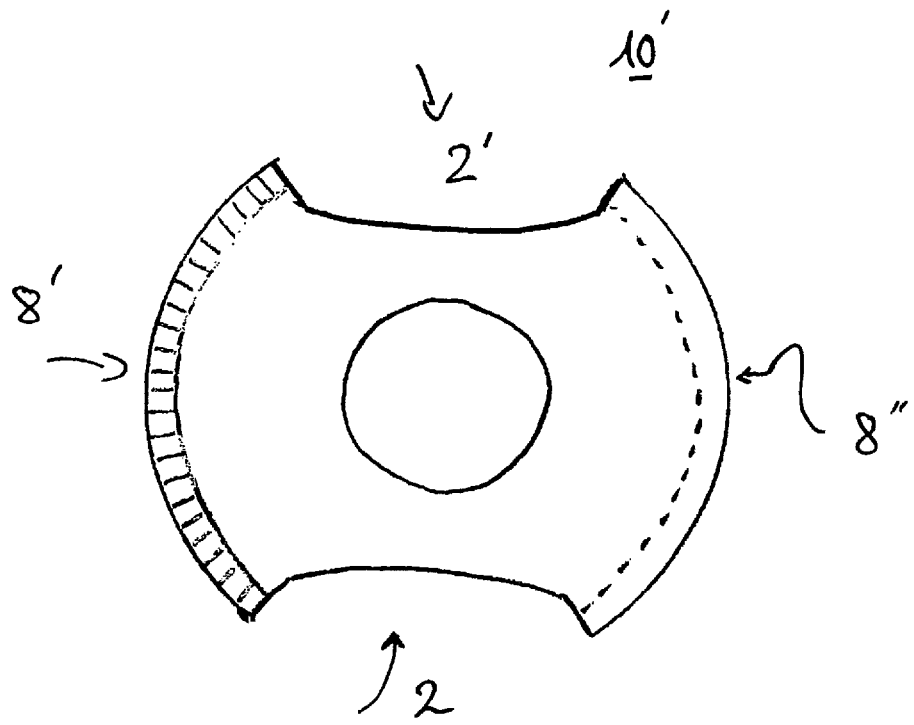
Figure 6:
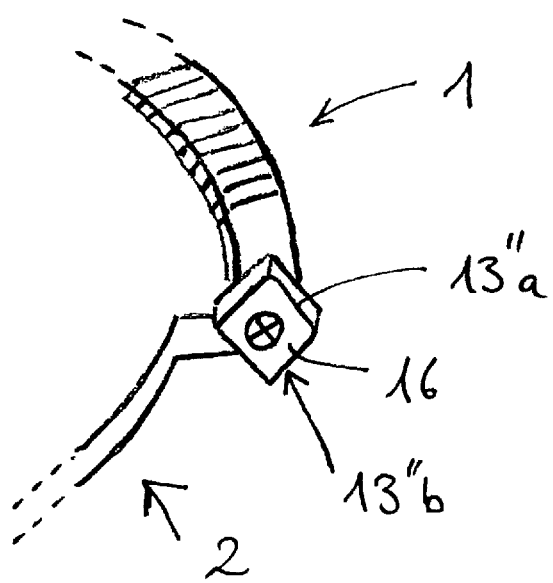

Further details, features and advantages of the invention can be found in the following description, given with reference to the accompanying drawings, in which:

FIG. 1 is a schematic view of a machine tool comprising a chamfering and deburring station, FIG. 2 is a perspective view of a first embodiment of a machining tool, FIG. 3 is a schematic view of a workpiece toothing and the machining engagement thereof in the machining tool from FIG. 2, FIG. 4 is a flow diagram of a method sequence, FIG. 5 is a schematic view of a further embodiment of a machining tool, FIG. 6 is a schematic view of a detail of a further embodiment of a machining tool, FIG. 7 schematically shows a drive, and FIG. 8 schematically shows a further drive.

The machine tool 100 that is shown only schematically in FIG. 1 is formed as a gear hobbing machine comprising a hobbing cutter 90. Said hobbing cutter is arranged on a tangential carriage 80 that is carried by a vertical carriage 70 in a manner mounted so as to be rotatable relative thereto (axis A). The vertical carriage 70 is in turn carried by the radial carriage 60 that can be slid along a machine bed 50 in order to change the axial spacing between the tool axis and the axis of a workpiece 30 to be machined that is clamped above a work table 40. Thus, three linear positioning axes X, Y, Z and one rotary positioning axis A are provided on the side of the primary tool, i.e. the hobbing cutter 90, which axes, just like the tool axis of rotation B and the workpiece axis of rotation C, are driven, in a manner CNC-controlled by a controller 99, by corresponding drives, e.g. direct drives. The positioning carriages shown in FIG. 1 are given by way of example, and the positioning axes required can also be achieved by structurally different carriage arrangements.

A chamfering and deburring station is arranged on the side that is diametrically opposed to the primary tool, the tools 20, 10 of which station can be moved towards and away from the workpiece 30, with respect to the radial direction X, by means of a common drive, schematically depicted in FIG. 7. In addition, the height of the chamfering and deburring station can be adjusted by a common drive, schematically depicted in FIG. 8. The chamfering and deburring station can also be positioned at a different point around the workpiece, provided that it has access to the workpiece.

The chamfering tool 20 shown at the top of FIG. 1 is formed as a typical roller deburring tool comprising two toothings that are spaced apart and that are each in rolling coupling engagement, on one end face, respectively, with the workpiece toothing under a contact pressure applied by the radial drive, and that produce a chamfer on the tooth end edges of the workpiece toothing in a known manner by means of deformation.

A disc-shaped deburring tool 10 is arranged axially below the chamfering tool 20 and so as to be spring-mounted relative thereto, which deburring tool is mounted so as to be able to be driven so as to rotate about the axis of rotation C7 thereof which, in this embodiment, extends coaxially to the axis of rotation C6 of the chamfering tool 20. It is also conceivable for the axes of rotation C7 and C6 to be differently positioned, e.g. in a parallel arrangement.

FIG. 2 more clearly shows an embodiment of a deburring tool 10. In this embodiment, the deburring tool 10 is formed, on both sides, as a filing disc over a peripheral region of approximately 270°, but not over 360°. Rather, the surface structure 8 formed as a file ends shortly before a radial cut-out in the (hollow) disc-like main body 6, which cut-out extends, in this embodiment, over approximately 60°. The main body 6 has a smaller radial dimension in this region 2 that is left after the cut-out than in the remaining region 1. A surface 12 at the transition between the regions 1 and 2 that extends substantially axially and radially and that is free on account of the cut-out comprises two oblique radially outer first edges 13a, b, since the peripheral surface of the main body 6 transitions from a planar shape into a conical shape between the region having the file structure 8 and the transition between the regions 1 and 2. In this case, the inclination of the first edges 13a, b corresponds to the inclination of the chamfer on the tooth tip end edge of the workpiece toothing. Horizontal second edges 14a, b adjoin the first edges 13a, b, which second edges originate from the cut in the main body 6 having the planar disc surface.

The deburring tool 10 can be positioned in various relative positions with respect to the workpiece 30 and in the process can carry out different functions, in particular carry out different types of machining on the workpiece.

The deburring tool 10 can thus be moved into a rotational position in which the file structure 8 thereof faces the workpiece and, following radial positioning, can be brought into a first machining engagement, by means of said file structure, with the end face of the workpiece toothing at the height thereof by means of axial infeed. In this first machining engagement, in which the deburring tool 10 can be stationary (or can also rotate slowly), secondary burrs can be very effectively removed from the end face of the workpiece toothing by being filed off. In this case, there is no danger of collision with the chamfering tool 20, since the radial dimension of said tool is smaller than that of the deburring tool 10 by approximately the radial depth of the file.

Furthermore, the deburring tool can be brought into a rotational position in which the radial vector of the surface 12 is directed towards the workpiece, and one of the first edges 13a, b is brought into a second machining engagement with the surface of the chamfer on the tooth tip end edge having the same inclination by means of axial and radial positioning. In this second machining engagement, excess material can be removed from the chamfer on the tooth tip end edge by means of turning, by rotation of the workpiece. Excess material of this kind may have been formed in the region close to the tooth tip on account of the chamfering tool 20, for example by forming the chamfer on the tooth end edge.

In the rotational position of the second machining engagement, the deburring tool 10 can, in addition, be moved to a modified height relative to the height of the second machining engagement, at which modified height the second edges 14a (b) come to rest at the same height as the end face of the toothing to be machined. In this position, when the radial infeed is appropriate, in a third machining engagement, e.g. already during production of the toothing, the primary tool can remove, by means of turning, a primary burr that has arisen on the (trailing) end face. Stresses on the file structure 8 are thus reduced in that said structure is mainly used to remove the secondary burrs.

Moreover, the deburring tool 10 carries out a function in a further rotational position in that the chamfering tool 20 can form the chamfer on the end edge of the toothing of the workpiece 3 without the workpiece 30 colliding with the deburring tool 10. In this rotational position, the region 2 of the main body 6 having a smaller radial extent faces the workpiece 30, e.g. in that the extensive centre of the region 2 is rotated towards the radial infeed axis. If, as in the embodiment shown, the region 2 has a radial extent that is smaller than that of the deburring tool 10 in the first region 1 by approximately twice the radial depth of the file structure 8, there is thus an a sufficient radial safety distance between the workpiece 30 and the deburring tool 10 when the chamfering tool 20 is in machining engagement with the toothing of the workpiece 30.

FIG. 3 again shows the workpiece 30 comprising a toothing 31 and a chamfer 33 on the tooth tip end edge, and also shows the second machining engagement of the deburring tool 10 in which the first edge 13a of the surface 12 frees the chamfer 33a on the tooth tip end face of the toothing 31 of excess material.

The method flow diagram in FIG. 4 shows machining of a toothing by means of the machine tool 100, which machining is a possible embodiment of the method of the invention.

In step S1, the workpiece 30 that is provided with a chamfer 33 on the tooth tip end edge is clamped on the workpiece spindle. In step S2, the toothing 31 is cut substantially to the complete toothing depth by means of hobbing using the hobbing cutter 90. In the case of a right-hand hobbing cutter 90, for example, the direction of rotation of the workpiece is anticlockwise (direction of rotation W1). In order to remove the primary burrs that form in the process, in this case the deburring tool 10 is in the third machining engagement, described above, with the workpiece 30.

In step S3, the chamfers on the tooth end edges 32 of the workpiece toothing 31 are produced by chamfering using the chamfering tool 20. For this purpose, the hobbing cutter 90 is retracted and the electronic coupling is transferred to the chamfering tool (direction of rotation W1). In order to achieve higher machining quality, the machining engagement can be repeated again after the direction of rotation has been reversed (direction of rotation W2).

In step S4, in the second machining engagement, described above, of the deburring tool, the chamfer on the tooth tip end edge is machined on the lower end face for example, while rotating the workpiece 30 in the same direction of rotation with which the step S3 was ended, and the second machining engagement is carried out (step S5) on this end face after the deburring tool 10 has been repositioned in order to machine the chamfer on the tooth tip end edge on the other end face. In this case, the rotational speed of the workpiece can be selected so as to be as high as possible, even maximum.

In step S6, the secondary burrs on the lower end face, for example, are removed by means of the above-described first machining engagement of the axially fed deburring tool 10 (filing off). In addition, the hobbing cutter 90 can simultaneously remove excess material from the tooth flanks in a second cut close to the lower end face, which excess material has also formed during chamfering of the tooth end edges. For this purpose, the direction of rotation is changed (direction of rotation W1) and the electronic coupling is again transferred to the hobbing cutter.

After the machining tools have been correspondingly repositioned, the same machining of step S6 is carried out on the other end face of the workpiece toothing 31 in step S7. During filing, the deburring tool is rotated slowly approximately about the angle that corresponds to the peripheral region of the file structure 8, in order to achieve uniform stress.

In step S8, after the tools have been withdrawn, the workpiece 30 that has now been soft-machined is removed from the workpiece spindle and transferred to further processing.

However, the machining sequence of upper and lower end face of the workpiece 30 can equally well be varied or reversed.

FIG. 2 further shows that the joint faces 12 between the first region 1 and the second region 2 are formed on the two peripheral ends of the second region 2, and therefore the above-described second and third machining engagement can take place in a suitable manner independently of the direction of rotation of the workpiece 30.

FIG. 5 shows a further embodiment of a deburring wheel 10'. Said wheel differs from the deburring tool 10 from FIG. 2 by a further region 2' having a smaller radial extent that is diametrically opposed to the second region 2. The first region 1 is therefore interrupted in this portion and thus two further transitions are created having corresponding first edges 13'a, b and second edges 14'a, b. The peripheral extension of the regions 2, 2' is approximately 50° in each case.

The advantage of this second embodiment is in the different design options of the two regions having the file structure 8' on the one hand and/or of the two regions having a smaller radial dimension 2, 2' with regard to the geometric design thereof on the other hand. In this case, the region 2 is designed in a manner suitable for the second and third machining engagement of one end face of the workpiece (and the (interfering) contours thereof), and the region 2' and the transitions thereof are designed in a manner suitable for machining the workpiece on the other end face (and the (interfering) contours thereof), as is also the case for the file regions 8', 8''. For example, the file region 8' is suitable for just one machining side while, on the opposite side of the tool, the file region 8'' can be used only for the other machining side of the workpiece, for example on account of different shapes of the workpiece end faces, such as inclined end faces and/or radii and/or undercuts.

In addition, if necessary the two portions of the file structure 8 that are now separated can be differently formed, for example as a coarse file and a fine file. This is also possible in the embodiment shown in FIG. 2.

In the embodiments of the deburring tool 10, 10' shown in FIG. 2 and FIG. 5, the cutting edges 13a, b/14a, b are direct edges of the material of the main body 6. In contrast, in the embodiment shown in a detail in FIG. 6, a HM insert 16 is attached to the surface 12 for example by screwing, which insert carries the cutting edges 13''a, b. Thus, for example, a set made up of a plurality of HM inserts 16, 16' of this kind, optionally having cutting edges that extend in geometrically different manners, can also be provided for a tool main body 6 having a file structure 8.

In addition, the chamfering tool 20 can also comprise a smooth region, as shown in drawing 8.2-5 on page 309 of the citation by Bausch or as is shown in drawing 8.2-6 on page 310, in particular if the removal of excess material on the tooth flanks is not intended to be carried out by the primary tool (30).

In addition, independently of any kind of machining of a chamfer on a tooth tip end face, a filing disc having a recess, i.e. a region having a smaller radial extent, has advantages in that the chamfering tool 20 and a deburring tool of this kind can also interact without the above-described second machining engagement, in particular in terms of the common infeed drives thereof and the collision-free positioning, in each case, of the inoperative tool.

The invention is not limited to the design features set out in the embodiments. Rather, the features set out in the following claims and in the above description can be essential to the implementation of the invention, in the various embodiments thereof, alone and in combination.

The invention claimed is:

1. Machining tool (10, 10') for machining a chamfer (33) formed on a tooth tip end edge of a toothing, the machining tool comprising a cutting edge (13a, b) for removing excess material from the chamfer (33) on the tooth tip end edge, wherein the machining tool is driveable so as to rotate about a machining tool axis and is formed in the manner of a disc, said disc comprising a disc-like main body having a first peripheral region and a second peripheral region with the second peripheral region being formed as a radial cut-out axially through the main body, the first peripheral region (1) having a radius and the second peripheral region (2) having a radius, with the radius of the second peripheral region (2) having a different dimension than the radius of the first peripheral region (1), and the cutting edge (13a, b) is arranged at a transition between the first (1) and the second (2) peripheral regions, said machining tool being a part of a toothing machining assembly wherein said toothing machining assembly further comprises a chamfering tool (20) that is driveable so as to rotate the chamfering tool about a chamfering tool axis of said assembly whereby the tooth tip end edge of a toothing is plastically deformed by roller deburring, wherein the first peripheral region comprises at least one flat surface, the first peripheral region having a surface structure (8) on said at least one flat surface, the surface structure forming a file, wherein the file includes a plurality of filing edges, wherein each of the filing edges extends from a respective first end edge location to a respective second end edge location, wherein each second end edge location is radially outside of the corresponding first end edge location, and wherein each first end edge location and each second end edge location are axially outside of said at least one flat surface; and wherein a joint face (12) having a radial main extension component and an axial main extension component is formed at the transition and wherein the cutting edge is an outer edge of the joint face or is formed on a cutting insert (16) attached to the joint face.

2. Machining tool according to claim 1 wherein the radius of the second region (2) has a smaller dimension than the radius of the first region (1).

3. Machining tool according to claim 1 wherein the first region comprises two subregions that have different geometrical designs and are peripherally mutually spaced.

4. Machining tool according to claim 3, wherein a peripheral intermediate region (2') is formed between the two subregions, the intermediate region having a cutting edge at the transition of the intermediate region to an adjacent one of the two subregions and/or having a smaller radius than the radius of said first region.

5. Machining tool according to claim 1 wherein a further cutting edge (14a, b) having at least one radial direction component is formed in the transition between the first and the second region, the direction of extension of which further cutting edge extends substantially in parallel with a disc plane of the machining tool.

6. Toothing machining assembly comprising:

a chamfering tool (20) that is driven so as to rotate about a chamfering tool axis of said assembly and is intended for plastically deforming a tooth tip end edge of a toothing, during roller deburring, and the assembly further comprising a machining tool (10, 10') for machining a chamfer (33) formed on the tooth tip end edge of the toothing, the machining tool comprising a cutting edge (13a, b) for removing excess material from the chamfer (33) on the tooth tip end edge, wherein the machining tool is driveable so as to rotate about a machining tool axis and is formed in the manner of a disc, said disc comprising a disc-like main body having a first peripheral region and a second peripheral region with the second peripheral region being formed as a radial cut-out axially through the main body, the first peripheral region (1) having a radius and the second peripheral region (2) having a radius, with the radius of the second peripheral region (2) having a different dimension than the radius of the first peripheral region (1), and the cutting edge (13a, b) is arranged at a transition between the first (1) and the second (2) peripheral regions, wherein the first peripheral region comprises at least one flat surface, the first peripheral region having a surface structure (8) on said at least one flat surface, the surface structure forming a file, wherein the file includes a plurality of filing edges, wherein each of the filing edges extends from a respective first end edge location to a respective second end edge location, wherein each second end edge location is radially outside of the corresponding first end edge location, and wherein each first end edge location and each second end edge location are axially outside of said at least one flat surface; and wherein a joint face (12) having a radial main extension component and an axial main extension component is formed at the transition and wherein the cutting edge is an outer edge of the joint face or is formed on a cutting insert (16) attached to the joint face.

7. Toothing machining assembly according to claim 6, wherein the chamfering tool and the machining tool are positioned on the same side of the toothing and have parallel axes of rotation in order to machine the toothing.

8. Toothing machining assembly according to claim 6 comprising a first common drive that brings about the radial infeed of both the chamfering tool and the machining tool, and/or a second common drive that brings about the axial displacement of both the chamfering tool and the machining tool.

9. Toothing machining assembly according to claim 6 wherein the chamfering tool and the machining tool can be driven independently of one another so as to rotate about their respective axes.

10. Toothing machining assembly according to claim 6, which assembly can occupy a first operating position in which the chamfering tool projects radially beyond the cutting tool with respect to a radial infeed direction, towards the toothing to be machined, and vice versa in a second operating position, it being possible to achieve a transition between the two operating positions by rotating the machining tool.

11. Toothing machining assembly according to claim 6 wherein the machining tool is axially spring-mounted relative to the chamfering tool.

12. Machine tool for machining toothings, comprising a gear-cutting tool (90) for producing a toothing on a workpiece, and comprising a toothing machining assembly according to claim 6.

\* \* \* \* \*